United States Patent
Toba

(10) Patent No.: US 6,438,392 B1
(45) Date of Patent: Aug. 20, 2002

(54) ABSENCE RECEPTION INFORMATION DEVICE AND ABSENCE RECEPTION INFORMATION METHOD FOR FOLDING PORTABLE CELLULAR PHONE

(75) Inventor: Hiroyuki Toba, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/293,059

(22) Filed: Apr. 16, 1999

(30) Foreign Application Priority Data

Apr. 20, 1998 (JP) .......................................... 10-109953

(51) Int. Cl.[7] .............................. H04B 1/38; H04M 9/00
(52) U.S. Cl. ...................... 455/567; 455/566; 455/90; 379/433.04; 379/433.13; 379/433.06
(58) Field of Search ................................. 455/567, 566, 455/550, 575, 90, 351, 445, 458; 379/428, 433, 428.01, 433.04, 433.06, 433.11, 433.13, 433.01

(56) References Cited

U.S. PATENT DOCUMENTS

| 4,803,717 A | | 2/1989 | Marui ...................... 379/88.11 |
| 4,875,229 A | | 10/1989 | Palett et al. ................ 455/550 |
| 5,251,250 A | | 10/1993 | Obata et al. ................ 455/412 |
| 5,953,413 A | * | 9/1999 | Peyer et al. ............ 379/433.13 |
| 6,094,565 A | * | 7/2000 | Alberth et al. ............... 455/567 |
| 6,125,286 A | * | 9/2000 | Jahagirdar et al. .......... 455/566 |
| 6,304,763 B1 | * | 10/2001 | Jahagirdar et al. .......... 455/566 |

FOREIGN PATENT DOCUMENTS

| EP | 0 260 352 | 3/1988 | ............ H04M/1/15 |
| EP | 0 472 044 | 2/1992 | ............ H04Q/7/04 |
| EP | 0 659 004 | 6/1995 | ............ H04M/1/72 |
| EP | 0 678 987 | 10/1995 | ............ H04B/1/38 |
| GB | 2 317 531 | 3/1998 | ............ H04M/1/02 |
| GB | 2 326 051 | 12/1998 | ............ H04M/1/02 |
| GB | 2 328 348 | 2/1999 | ............ H04B/1/38 |
| JP | 62-250727 | 10/1987 | ............ H04B/1/40 |
| JP | 4-111655 | 4/1992 | ............ H04M/1/02 |
| JP | 5-14478 | 1/1993 | ............ H04M/1/64 |
| JP | 6-291720 | 10/1994 | ............ H04B/7/26 |
| JP | 10-215303 | 8/1998 | ............ H04B/1/38 |

* cited by examiner

Primary Examiner—William Trost
Assistant Examiner—Rafael Perez-Gutierrez
(74) Attorney, Agent, or Firm—Young & Thompson

(57) ABSTRACT

An absence reception information device for informing the user of a folding portable cellular phone about occurrence of a call during the user's absence is proposed. A folding portable cellular phone generally has a body, a cover section which is rotatably attached to the body, and an LCD (Liquid Crystal Display) for displaying necessary information. The LCD is usually provided on the inner side of the body or the cover section and can not be seen by the user when the cover section is closed. The absence reception information device comprises an LED (Light-Emitting Diode) which is placed on the folding portable cellular phone so as to be seen by the user when the cover section is closed, and an open/close detection circuit. The open/close detection circuit detects whether the cover section is opened or closed. The LED executes absence reception information display for informing the user about occurrence of a call during the user's absence, when the open/close detection circuit is detecting that the cover section is closed. The user can easily see the LED and check whether or not a call from a calling party occurred during the user's absence, even if the cover section is closed, that is, even if the folding portable cellular phone is folded up.

22 Claims, 3 Drawing Sheets

ABSENCE RECEPTION INFORMATION DEVICE AND ABSENCE RECEPTION INFORMATION METHOD FOR FOLDING PORTABLE CELLULAR PHONE

BACKGROUND OF THE INVENTION

The present invention relates to a device and a method for informing the user of a folding portable cellular phone, whose LCD (Liquid Crystal Display) is placed inside and can not been seen by the user when the folding portable cellular phone is folded up, about occurrence of a call during the user's absence (i.e., about occurrence of an absence reception of a call).

DESCRIPTION OF THE PRIOR ART

Portable cellular phones have come into wide use these days, and there have been on the market various types of portable cellular phones, including folding portable cellular phones which can be folded up into a small size. Such a folding portable cellular phone that has been folded up can be carried in the pocket of a shirt. The folding portable cellular phone is generally composed of a body and a cover section which is rotatably attached to the body by a hinge, and the body or the cover section is provided with an LCD (Liquid Crystal Display) for displaying necessary information to the user. The LCD is usually provided on the inner side of the body or the cover section so as to be seen by the user when the cover section is opened, and thus the LCD can not been seen by the user when the cover section is closed, that is, when the folding portable cellular phone is folded. An example of such a folding portable cellular phone has been disclosed in Japanese Patent Application Laid-Open No.HEI4-111655. The folding portable cellular phone disclosed in the document is provided with a call reception display means for informing the user about reception of a call, on the distal end of the body or the cover section (from the hinge). Such a call reception display means on the distal end of the body or the cover section can inform the user of reception of a call signal by light, even when the folding portable cellular phone is folded.

Meanwhile, there have been proposed portable cellular phones which are provided with functions for informing the user about occurrence of a call from a calling party while the user's absence (i.e., about occurrence of an absence reception of a call), and displaying reception information such as a telephone number of the calling party, as disclosed in Japanese Patent Application Laid-Open No.HEI6-291720, and Japanese Patent Application Laid-Open No.SH062-250727. Generally, the user is judged to be absent (i.e., away from the portable cellular phone) if the user does not respond to the call by pushing a key of the portable cellular phone during the ringing, and thereafter absence reception information operation for informing the user about the occurrence of the absence reception is executed. It is also possible to let the portable cellular phone judge that the user is absent, if the user does not respond to the call within a predetermined number of ringing tones, as mentioned in Japanese Patent Application Laid-Open No.HEI5-14478. In the absence reception information operation, generally, letters indicating the occurrence of the absence reception is displayed on an LCD of the portable cellular phone.

However, in the case of the folding portable cellular phones which has been mentioned before, the user can not see the LCD which is placed on the inner side of the body or the cover section when the folding portable cellular phone is folded, and thus the user has to take the trouble to open the cover section in order to check whether or not an absence reception has occurred.

SUMMARY OF THE INVENTION

It is therefore the primary object of the present invention to provide an absence reception information device for a folding portable cellular phone, by which the user can easily check whether or not an absence reception has occurred, even if the folding portable cellular phone is folded.

Another object of the present invention is to provide an absence reception information method for a folding portable cellular phone, by which the user can easily check whether or not an absence reception has occurred, even if the folding portable cellular phone is folded.

In accordance with a first aspect of the present invention, there is provided an absence reception information device for a folding portable cellular phone which has a body, a cover section which is rotatably attached to the body, and an LCD (Liquid Crystal Display) which is placed inside the folding portable cellular phone when the cover section is closed. The absence reception information device comprises a cover section open/close detection means and an absence reception display means. The cover section open/close detection means detects whether the cover section is opened or closed. The absence reception display means is placed on the folding portable cellular phone so as to be seen by the user when the cover section is closed. The absence reception display means executes absence reception information display for informing the user about occurrence of a call during the user's absence, when the cover section open/close detection means is detecting that the cover section is closed.

In accordance with a second aspect of the present invention, in the first aspect, the absence reception display means employed for the absence reception information display is an LED (Light-Emitting Diode).

In accordance with a third aspect of the present invention, in the first aspect, the absence reception information device further comprises a switching off means. The switching off means switches the absence reception display means off when the cover section open/close detection means detects that the cover section is opened.

In accordance with a fourth aspect of the present invention, there is provided an absence reception information device for a folding portable cellular phone which has a body, a cover section which is rotatably attached to the body, and an LCD (Liquid Crystal Display) which is placed inside the folding portable cellular phone when the cover section is closed. The absence reception information device comprises a cover section open/close detection means, a user absence judgment means and an absence reception display means. The cover section open/close detection means detects whether the cover section is opened or closed. The user absence judgment means judges that the user is absent when a call occurred if a predetermined period elapsed since reception of a call signal without a response by the user. The absence reception display means is placed on the folding portable cellular phone so as to be seen by the user when the cover section is closed. The absence reception display means executes absence reception information display for informing the user about occurrence of a call during the user's absence if the user absence judgment means judged that the user was absent, when the cover section open/close detection means is detecting that the cover section is closed.

In accordance with a fifth aspect of the present invention, in the fourth aspect, the absence reception display means employed for the absence reception information display is an LED (Light-Emitting Diode).

In accordance with a sixth aspect of the present invention, in the fourth aspect, the absence reception information device further comprises a switching off means. The switching off means switches the absence reception display means off when the cover section open/close detection means detects that the cover section is opened.

In accordance with a seventh aspect of the present invention, there is provided an absence reception information method for a folding portable cellular phone which has a body, a cover section which is rotatably attached to the body, and an LCD (Liquid Crystal Display) which is placed inside the folding portable cellular phone when the cover section is closed. The absence reception information method comprises a cover section open/close detection step and an absence reception display step. In the cover section open/close detection step, a cover section open/close detection means of the folding portable cellular phone detects whether the cover section is opened or closed. In the absence reception display step, an absence reception display means, which is placed on the folding portable cellular phone so as to be seen by the user when the cover section is closed, executes absence reception information display for informing the user about occurrence of a call during the user's absence, when the cover section open/close detection means is detecting that the cover section is closed.

In accordance with an eighth aspect of the present invention, in the seventh aspect, the absence reception display means employed for the absence reception display step is an LED (Light-Emitting Diode).

In accordance with a ninth aspect of the present invention, in the seventh aspect, the absence reception information method further comprises a switching off step in which the absence reception display means is switched off when the cover section open/close detection means detects that the cover section is opened.

In accordance with a tenth aspect of the present invention, there is provided an absence reception information method for a folding portable cellular phone which has a body, a cover section which is rotatably attached to the body, and an LCD (Liquid Crystal Display) which is placed inside the folding portable cellular phone when the cover section is closed. The absence reception information method comprises a cover section open/close detection step, a user absence judgment step and an absence reception display step. In the cover section open/close detection step, a cover section open/close detection means of the folding portable cellular phone detects whether the cover section is opened or closed. In the user absence judgment step, a user absence judgment means of the folding portable cellular phone judges that the user is absent when a call occurred if a predetermined period elapsed since reception of a call signal without a response by the user. In the absence reception display step, an absence reception display means, which is placed on the folding portable cellular phone so as to be seen by the user when the cover section is closed, executes absence reception information display for informing the user about occurrence of a call during the user's absence if the user absence judgment means judged in the user absence judgment step that the user was absent, when the cover section open/close detection means is detecting that the cover section is closed.

In accordance with an eleventh aspect of the present invention, in the tenth aspect, the absence reception display means employed for the absence reception display step is an LED (Light-Emitting Diode).

In accordance with a twelfth aspect of the present invention, in the tenth aspect, the absence reception information method further comprises a switching off step in which the absence reception display means is switched off when the cover section open/close detection means detects that the cover section is opened.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Figure 1:
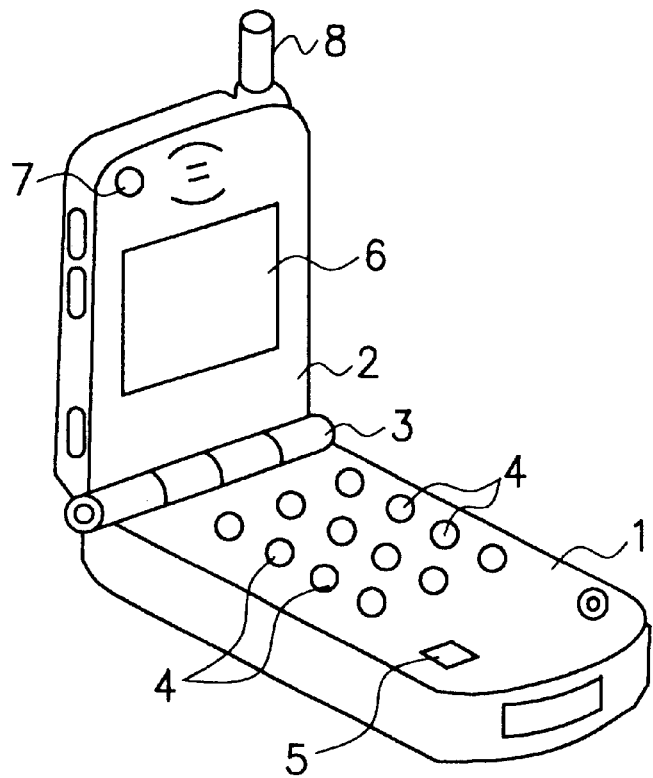
FIG. 1 is a perspective view of a folding portable cellular phone in which an absence reception information method and an absence reception information device according to an embodiment of the present invention are employed.

Referring now to the drawings, a description will be given in detail of preferred embodiments in accordance with the present invention.

Figure 2:
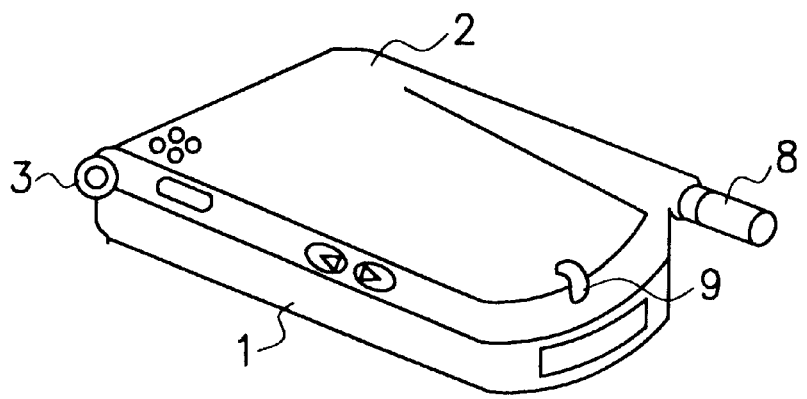
FIG. 2 is a perspective view showing the folding portable cellular phone of when folded.

FIG. 1 is a perspective view of a folding portable cellular phone in which an absence reception information method and an absence reception information device according to an embodiment of the present invention are employed. The folding portable cellular phone is mainly composed of a body 1 and a cover section 2 which is rotatably attached to the body 1. The cover section 2 is attached to the body 1 by a hinge 3 so as to be able to be opened as shown in FIG. 1 and closed as shown in FIG. 2.

The body 1 is provided with a plurality of operation keys 4 and an open/close detection circuit 5. The open/close detection circuit 5 can be realized by employing, for example, a switch which is closed (i.e., turned into conduction) by a magnetic field. The body 1 includes major components of the absence reception information device. The cover section 2 is provided with an LCD (Liquid Crystal Display) 6 and a magnet 7 on its inner side. The open/close detection circuit 5 detects a magnetic field of the magnet 7 and outputs a close detection signal when the folding portable cellular phone is folded, that is, when the cover section 2 is closed. The open/close detection circuit 5 outputs an open detection signal when the folding portable cellular phone is not folded, that is, when the cover section 2 is opened. Incidentally, the open/close detection circuit 5 can also be realized by a Hall element. The cover section 2 is further provided with an antenna 8 and an LED (Light-Emitting Diode) 9. The LED 9 is provided on the outer surface of the cover section 2 so as to be seen by the user even when the folding portable cellular phone is folded.

Figure 3:
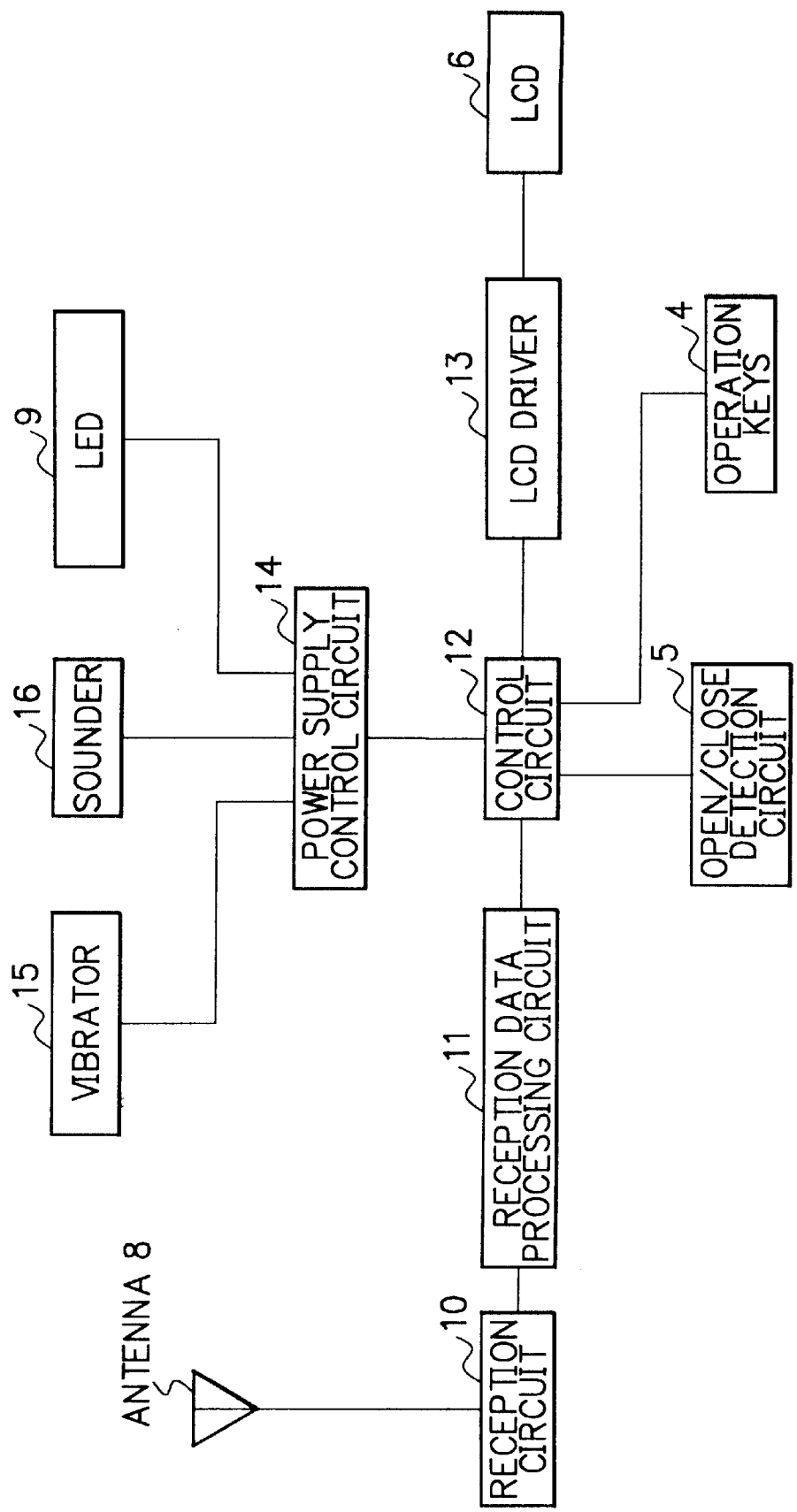
FIG. 3 is a block diagram of the absence reception information device which is employed in the folding portable cellular phone of FIG. 1

FIG. 3 is a block diagram of the absence reception information device of this embodiment. Referring to FIG. 3, the absence reception information device comprises the operation keys 4, the open/close detection circuit 5, the LCD 6, the LED 9, a reception circuit 10, a reception data processing circuit 11, a control circuit 12, an LCD driver 13, a power supply control circuit 14, a vibrator 15, and a sounder 16 such as a buzzer.

The antenna 8 is connected to the reception circuit 10. The reception data processing circuit 11 is connected to the reception circuit 10. The reception data processing circuit 11, the operation keys 4, the open/close detection circuit 5, the LCD driver 13, and the power supply control circuit 14 are connected to the control circuit 12. The LCD 6 is connected to the LCD driver 13. The vibrator 15, the sounder 16, and the LED 9 are connected to the power supply control circuit 14. The control circuit 12 is realized by, for example, a microprocessor unit which is composed of a CPU (Central Processing Unit), ROM (Read Only Memory), RAM (Random Access Memory), etc.

A signal transmitted by a base station is received by the reception circuit 10 via the antenna 8, and processed by the reception data processing circuit 11. The output of the reception data processing circuit 11 is supplied to the control circuit 12. The control circuit 12 judges whether or not the signal received by the reception circuit 10 is a call signal to the folding portable cellular phone itself. When the control circuit 12 judged that the signal is a call signal to the folding portable cellular phone itself, the control circuit 12 executes a call reception information process, in order to inform the user about reception of a call. Concretely, the control circuit 12 controls the power supply control circuit 14 according to settings which have preliminarily been set by the user, and thereby activates the vibrator 15 or the sounder 16. If the user responded to the call by pushing one of the operation keys 4, the process proceeds to a conversation status, in which the user talks with the calling party.

If the user did not respond to the call by pushing the operation keys 4 during the call reception information process, that is, if the call signal from the base station ended without a response of the user, the control circuit 12 stores reception data (a telephone number or an ID of the calling party, a timestamp, etc.) and thereafter executes an absence reception information process, in order to inform the user about reception of the call during the user's absence. In the above judgment on the user's absence, it is also possible to let the control circuit 12 judge that the user is absent when a predetermined period elapsed since the beginning of the call signal without a response of the user.

The control circuit 12 can execute the absence reception information process in two ways. In the case where the open/close detection circuit 5 outputs the open detection signal to the control circuit 12, the control circuit 12 activates the LCD driver 13 and thereby executes absence reception information display by the LCD 6. In this case, the control circuit 12 controls the power supply control circuit 14 so that the LED 9 will not be activated. In the case where the open/close detection circuit 5 outputs the close detection signal to the control circuit 12, the control circuit 12 controls the power supply control circuit 14 so that the LED 9 will be activated (lighting up or blinking). In this case, the control circuit 12 does not activate the LCD driver 13, and thus the absence reception information display is executed only by lighting up or blinking of the LED 9.

Figure 4:
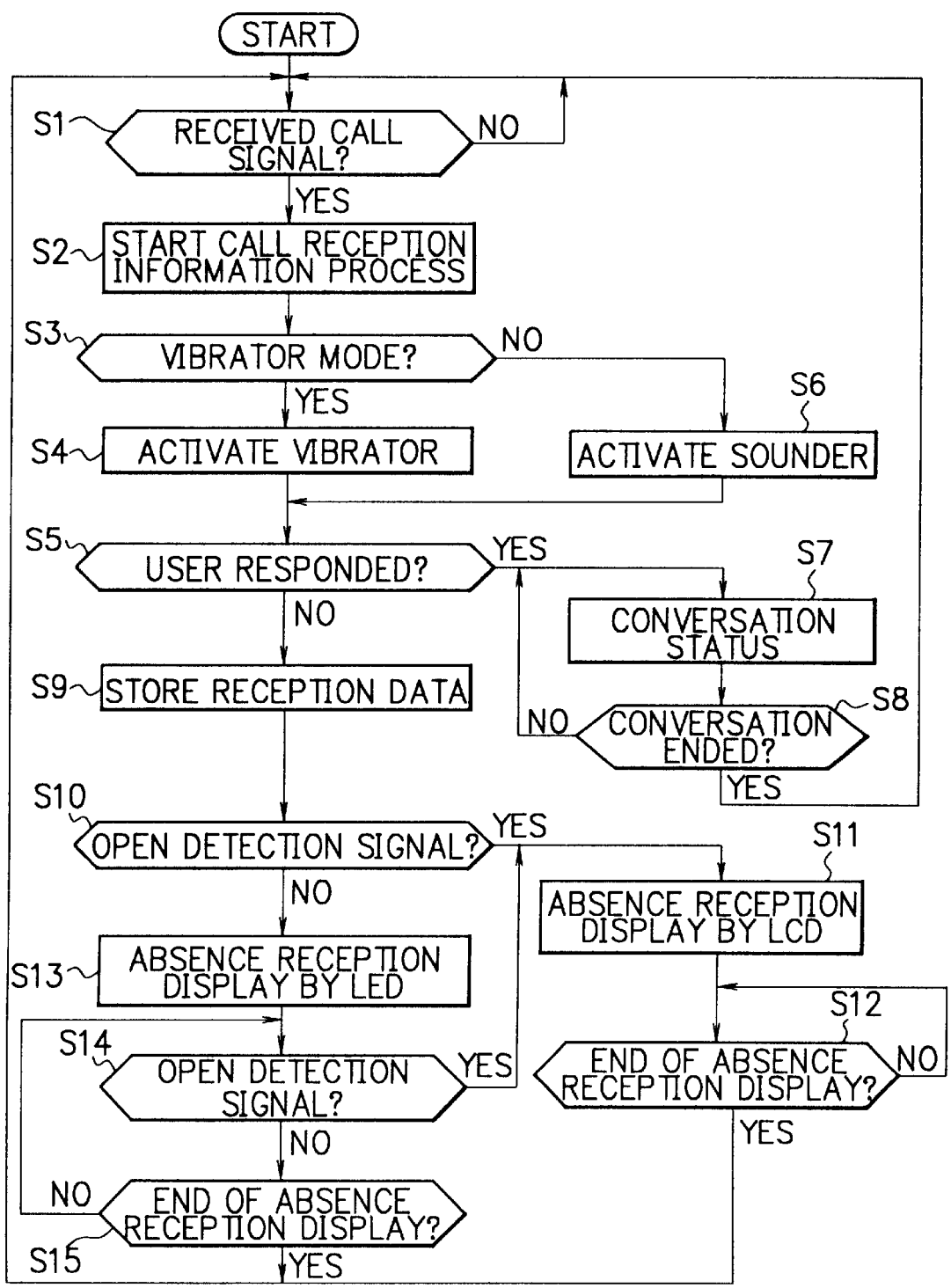
FIG. 4 is a flow chart showing an example of the operation of the absence reception information device.

In the following, the operation of the absence reception information device according to the embodiment of the present invention will be described referring to FIG. 3 and, FIG. 4. FIG. 4 is a flow chart showing an example of the operation of the absence reception information device. In step S1, the control circuit 12 judges whether or not a call signal to the folding portable cellular phone itself has been received by the reception circuit 10. If a call signal to the folding portable cellular phone has been received ("YES" in the step S1), the control circuit 12 starts the call reception information process (step S2). The operation in the call reception information process has previously been determined and set by the user. The user preliminarily makes a selection between the vibrator 15 and the sounder 16 for being used for the call reception information process and stores the setting into the control circuit 12 by operating the operation keys 4. In step S3, the control circuit 12 judges whether or not the setting for the call reception information process is "vibrator mode" or not. If the setting is the vibrator mode ("YES" in the step S3), the control circuit 12 instructs the power supply control circuit 14 to activate the vibrator 15 and thereby the user is informed of the reception of the call by the vibration of the vibrator 15 (step S4). Thereafter the process proceeds to step S5. If the setting is not the vibrator mode ("NO" in the step S3), the control circuit 12 instructs the power supply control circuit 14 to activate the sounder 16 and thereby the user is informed of the reception of the call by the sound of the sounder 16 (step S6). Thereafter the process proceeds to the step S5.

In the step S5, the control circuit 12 judges whether or not the user has responded to the call by operating or pushing one of the operation keys 4. If the user responded to the call ("YES" in the step S5), the process proceeds to the conversation status in which the user talks with the calling party (step S7). After the conversation is over ("YES" in step S8), the process is returned to the step S1. If the user did not respond to the call ("NO" in the step S5), the control circuit 12 stores the reception data (i.e., the telephone number or the ID of the calling party, the timestamp, etc.) (step S9) and thereafter proceeds to step S10. Incidentally, in the above judgment in the step S5, it is also possible to let the control circuit 12 judge that the user did not respond to the call when a predetermined period elapsed without a response of the user since the beginning of the call reception information process.

In the step S10, the control circuit 12 judges whether or not the open detection signal is supplied from the open/close detection circuit 5. If the open detection signal is supplied from the open/close detection circuit 5, that is, if the folding portable cellular phone is not folded ("YES" in the step S10), the control circuit 12 executes the absence reception information process using the LCD 6 (step S11). On the LCD 6, letters indicating occurrence of the absence reception and the reception data (the telephone number of the calling party, the timestamp, etc.) are displayed, for example. In the next step S12, the control circuit 12 judges whether or not the user has requested to finish the absence reception information process by pushing a clear button. If the user has requested to finish the absence reception information process ("YES" in the step S12), the absence reception information process using the LCD 6 is ended, and the process is returned to the step S1.

If the open detection signal is not supplied from the open/close detection circuit 5, that is, if the folding portable cellular phone is folded ("NO" in the step S10), the control circuit 12 executes the absence reception information process using the LED 9 (step S13). Subsequently, the control circuit 12 further judges whether or not the open detection signal is supplied from the open/close detection circuit 5 (step S14). If the open detection signal is supplied from the open/close detection circuit 5, that is, if the user opened the folding portable cellular phone ("YES" in the step S14), the process proceeds to the step S1 and the control circuit 12 thereafter executes the absence reception information process using the LCD 6. On the LCD 6, letters indicating occurrence of the absence reception and the reception data (i.e., the telephone number of the calling party, the timestamp, etc.) are displayed, for example. If the open detection signal is not supplied from the open/close detection circuit 5, that is, if the folding portable cellular phone remains folded ("NO" in the step S14), the process proceeds to the next step S15. In the step S15, the control circuit 12 judges whether or not the user has requested to finish the absence reception information process by pushing the clear button. If the user has not requested to finish the absence reception information process ("NO" in the step S15), the process is returned to the step S14. If the user has requested to finish the absence reception information process ("YES" in the step S15), the absence reception information process using the LED 9 is ended, and the process is returned to the step S1.

As described above, by the absence reception information method and the absence reception information device for a folding portable cellular phone according to the embodiment of the present invention, the user of a folding portable cellular phone can easily see the absence reception information display and check whether or not a call from a calling party occurred during the user's absence, even if the folding portable cellular phone is folded up. Therefore, the convenience of the user of the folding portable cellular phone can be improved further.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An absence reception information method for a folding portable cellular phone which has a body, a cover section which is rotatably attached to the body, and an interior LCD (Liquid Crystal Display) which is placed inside the folding portable cellular phone when the cover section is closed, comprising the steps of:

a cover section open/close detection step in which a cover section open/close detection means of the folding portable cellular phone detects whether the cover section is opened or closed;

a user absence judgment step in which a user absence judgment means of the folding portable cellular phone judges that the user is absent when a call occurred if a predetermined period elapsed since reception of a call signal without a response by the user and without the cellular phone going off-hook; and an absence reception display step in which an unanswered call display, which is placed on the folding portable cellular phone so as to be visible when the cover section is closed, executes absence reception information display for informing the user about occurrence of a call during the user's absence if the user absence judgment means judged in the user absence judgment step that the user was absent, the unanswered call display being activated to indicate the unanswered call only if the cover section open/close detection means detects that the cover is closed, and the interior LCD being activated to indicate the unanswered call only if the cover section open/close detection means detects that the cover is open.

2. An absence reception information method for a folding portable cellular phone as claimed in claim 1, wherein the unanswered call display comprises an LED (Light-Emitting Diode).

3. An absence reception information method for a folding portable cellular phone which has a body, a cover section which is rotatably attached to the body, and an interior LCD (Liquid Crystal Display) which is placed inside the folding portable cellular phone when the cover section is closed, comprising the steps of:

a cover section open/close detection step in which a cover section open/close detection means of the folding portable cellular phone detects whether the cover section is opened or closed; and an absence reception display step in which an unanswered call display, which is placed on the folding portable cellular phone so as to be visible when the cover section is closed, executes absence reception information display for informing the user about occurrence of a call during the user's absence, the unanswered call display being activated to indicate the unanswered call only if the cover section open/close detection means detects that the cover is closed, and the interior LCD being activated to indicate the unanswered call only if the cover section open/close detection means detects that the cover is open;

wherein in the absence reception display step, the unanswered call during the user's absence identified as a received call that terminates without the cellular phone going off hook.

4. An absence reception information method for a folding portable cellular phone as claimed in claim 3, wherein the unanswered call display comprises an LED (Light-Emitting Diode).

5. An absence reception information device for a folding portable cellular phone which has a body, a cover section which is rotatably attached to the body, and an interior LCD (Liquid Crystal Display) which is placed inside the folding portable cellular phone when the cover section is closed, comprising:

a cover section open/close detection means for detecting whether the cover section is opened or closed;

a user absence judgment means which determines that the user is absent when a call occurred if a predetermined period elapsed since reception of a call signal without a response by the user and the cellular phone has not gone off hook; and an unanswered call display disposed on the folding portable cellular phone so as to be visible when the cover section is closed, wherein when the user absence judgment means has determined that the user is absent, the unanswered call display is activated to indicate the unanswered call only if the cover section open/close detection means detects that the cover is closed, and the interior LCD is activated to indicate the unanswered call only if the cover section open/close detection means detects that the cover is open.

6. An absence reception information device for a folding portable cellular phone as claimed in claim 5, further comprising a switching off means for switching the unanswered call display off when the cover section open/close detection means detects that the cover section is opened.

7. An absence reception information device for a folding portable cellular phone as claimed in claim 5, wherein the unanswered call display comprises an LED (Light-Emitting Diode).

8. An absence reception information device for a folding portable cellular phone which has a body, a cover section which is rotatably attached to the body, and an interior LCD (Liquid Crystal Display) which is placed inside the folding portable cellular phone when the cover section is closed, comprising:

a cover section open/close detection means for detecting whether the cover section is opened or closed; and an unanswered call display arranged on the folding portable cellular phone so as to be visible when the cover section is closed;

wherein when the absence reception information device has determined that an incoming call has not been answered, the unanswered call display is activated to indicate the unanswered call only if the cover section open/close detection means detects that the cover is closed, and the interior LCD is activated to indicate the unanswered call only if the cover section open/close detection means detects that the cover is open; and wherein the absence reception information device determines that the incoming call has not been answered when the call terminates without the cellular phone going off-hook.

9. The absence reception information device of claim 8, wherein the absence reception information device determines that the incoming call has not been answered by identifying that at least a predetermined time period has elapsed from a time that the incoming call was first received and the incoming call has not been answered.

10. An absence reception information device for a folding portable cellular phone as claimed in claim 8, further comprising a switching off means for switching the unanswered call display off when the cover section open/close detection means detects that the cover section is opened.

11. The absence reception information device of claim 8 wherein the absence reception information device determines that the incoming call has not been answered by identifying that the incoming call was terminated by a caller prior to being answered.

12. The absence reception information device of claim 8, wherein the absence reception information device continues to activate one of the unanswered call display and the interior LCD until an unanswered call condition is cleared.

13. The absence reception information device of claim 12, wherein the absence reception information device determines that the incoming call has not been answered by identifying that at least a predetermined time period has elapsed from a time that the incoming call was first received and the incoming call has not been answered.

14. The absence reception information device of claim 12, wherein the absence reception information device determines that the incoming call ha s not been answered by identifying that the incoming call was terminated by a caller prior to being answered.

15. The absence reception information device of claim 12, wherein the unanswered call condition is cleared by actuation of a clear button on the cellular phone.

16. An absence reception information device for a folding portable cellular phone as claimed in claim 1, wherein the unanswered call display comprises an LED (Light-Emitting Diode).

17. A cellular phone comprising:

a folding body capable of open and closed positions;

an interior display device which is visible only when the body is in the open position; and an exterior display device which is visible when the body is in the closed position;

wherein when an incoming call is unanswered, the exterior display is driven to indicate the unanswered call only while the folding body is in the closed position, the interior display being driven to indicate the unanswered call only when the folding body is in the open position; and wherein the call is unanswered when the call terminates without the cellular phone going off-hook.

18. The cellular phone of claim 17, wherein an incoming call is determined to be unanswered when a predetermined time has passed from first receipt of the incoming call without the incoming call being answered.

19. The cellular phone of claim 17, wherein an incoming call is determined to be unanswered when the incoming call is terminated by a caller prior to being answered on the cellular phone.

20. The cellular phone of claim 17, wherein one of the interior and exterior displays continues to indicate the unanswered call until a clear button is actuated.

21. The cellular phone of claim 20, wherein an incoming call is determined to be unanswered when a predetermined time has passed from first receipt of the incoming call without the incoming call being answered.

22. The cellular phone of claim 20, wherein an incoming call is determined to be unanswered when the incoming call is terminated by a caller prior to being answered on the cellular phone.

\* \* \* \* \*